A. F. Smith,
Locomotive.
No. 2,536. Reissued Apr. 2, 1867.
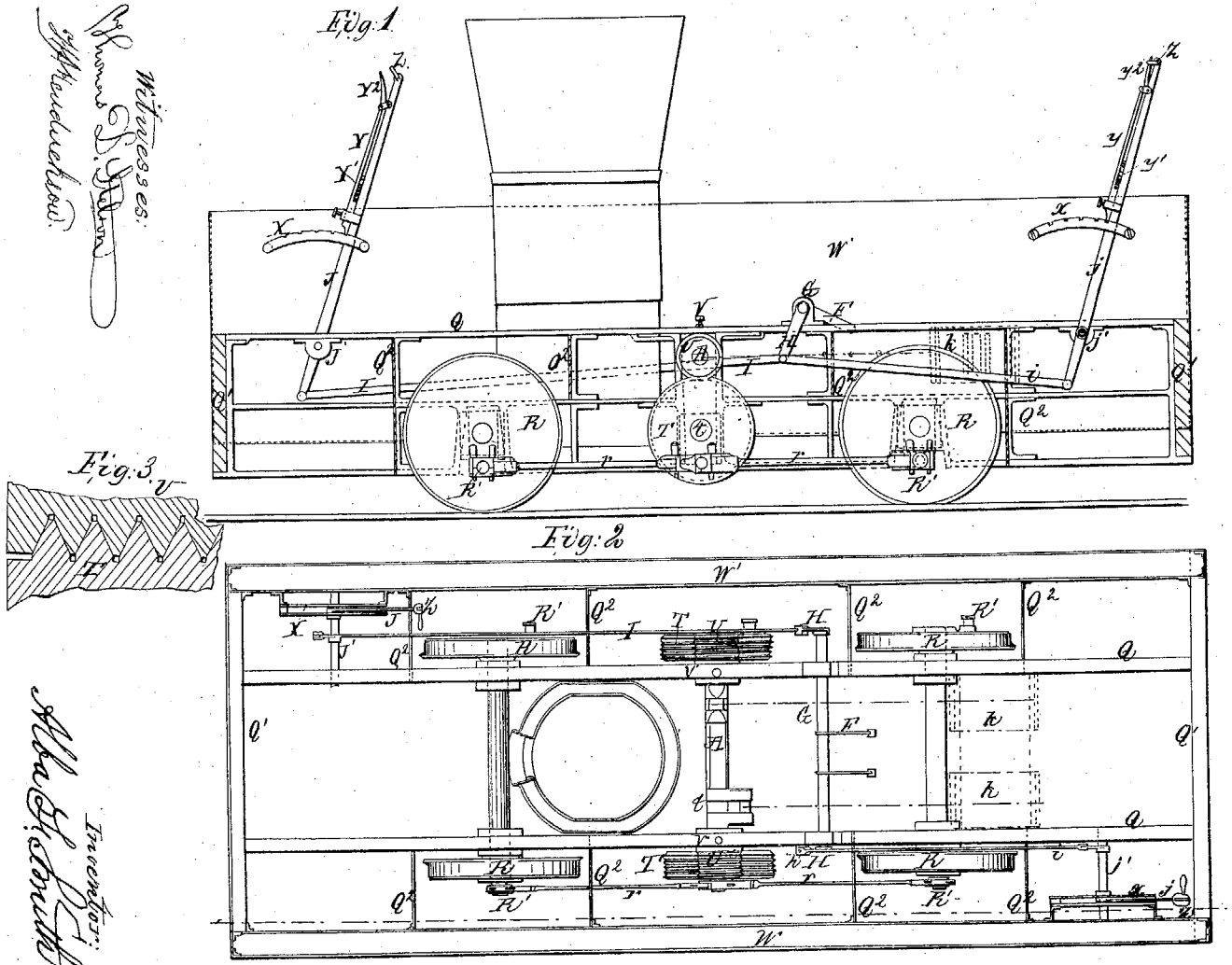
Witnesses:
Thomas D. Stetson
J. H. Hendrickson.
Inventor:
Alba F. Smith
AM. PHOTO-LITHO. CO. N.Y. (OSBORNE'S PROCESS.)

United States Patent Office.

ALBA F. SMITH, OF NORWICH, CONNECTICUT.

*Letters Patent No.* 42,233, *dated April* 5, 1864; *reissue No.* 2,536, *dated April* 2, 1867.

IMPROVEMENT IN LOCOMOTIVE STEAM ENGINES.

The Schedule referred to in these Letters Patent and making part of the same.

TO ALL WHOM IT MAY CONCERN:

Be it known that I, ALBA F. SMITH, of Norwich, in the county of New London, in the State of Connecticut, have invented certain new and useful improvements in Locomotive Steam Engines, intended mainly for those which are adapted, by reason of their silence and of their other qualities, to operate in the streets of cities, and which are known as dummy locomotives; and I do hereby declare that the following is a full and exact description thereof, reference being had to the accompanying drawings, forming a part of this specification.

These drawings represent the features claimed as novel, introduced properly in a dummy, with only so much of the other features as seems to be required in order to properly explain the relations of the several parts.

Figure 1 is a longitudinal vertical section through the entire structure, on the line S S, in fig. 2.

Figure 2 is a plan view of the same; and

Figure 3 is a section of a portion of the mechanism on a larger scale.

Similar letters of reference indicate like parts in all the drawings. The tints are employed merely to aid in distinguishing parts, and do not indicate the kind of material employed, which may be of iron or steel.

To enable others skilled in the art to make and use my invention, I will proceed to describe it by the aid of the drawings and of the letters of reference marked thereon.

Q Q are side frames provided with jaws which enclose boxes supporting the weight upon the axles of the driving-wheels, R, in the ordinary manner. Connections, *r r*, lead from stout pins, R′, on the exteriors of R, to a pair of large wheels, T, mounted on opposite ends of the shaft *t* in the positions represented, so that by the revolution of the wheels T, all the wheels, R, may be powerfully rotated in the obvious manner. The surface of each wheel, T, is turned or otherwise formed in grooves, as represented, as is also the surface of each of a pair of smaller wheels, U, which are rigidly keyed on the main driving-shaft A, mounted in boxes carried in the framing Q Q. The surfaces of these wheels, U U and T T, are pressed together with any degree of force desired, by the screws V. These screws are tapped through the framing Q Q, and transmit pressure through plates of metal and sheets of rubber, or the like elastic medium, not represented, to the boxes in which the shaft A is supported.

Locomotives usually contain, as a part of themselves, two cylinders, two pistons, two valves, &c. I will, for convenience, designate the two cylinders, with their accompanying parts, as two engines. Two such engines are mounted in the positions indicated by the slight outlines done in red, marked *k k*. The working parts of these engines, *k k*, are of ordinary character, except that all are smaller and lighter, and are adapted for quicker action than the corresponding parts, which may, with equal propriety, be termed the engines of ordinary locomotives of equal power. The valves are operated from eccentrics, not represented, on the shaft A; and what is commonly known as the link motion, or Stevenson link motion, is employed to communicate the right movements to the valve of each engine. These well-known parts are constructed and arranged in the manner which is obvious, and are omitted from the drawings to avoid confusion.

Two water tanks, W W′, formed of sheet metal of sufficient thickness, are mounted in the positions represented, and are rigidly connected to the framing Q Q, and to each other by the stout cross-frames, $Q^1$, and the braces, $Q^2$. These tanks are narrow, but have much depth, and extend the entire length of the structure, so that the quantity of water they contain is sufficient for all the purposes of supplying both boiler and condenser. The two tanks are connected to each other by pipes, not represented, above and below the water line, so that the level of the water and the pressure of any steam or air therein are always equal, or very nearly so, in the two. These tanks stiffen the structure, and, in case that a carriage or any other mass impinges against the structure, one of the tanks is simply indented, or, at worst, ruptured, and the evil is readily repaired.

The Stevenson links, not represented, perform only their usual functions of reversing the motion of the engines, and of varying the point of "cut-off," according as they are raised and lowered; but the raising and lowering of these links, and the locking and unlocking of the parts, are effected by the engineer while standing at either end of the structure, and the means for doing this are peculiar, and are represented in full.

J is a hand-lever pivoted to the framing at J′, and playing between two fixed segments or "quadrants," X, provided with rectangular notches. A catch or locking bolt, Y, is carried on the side of this lever J, adapted to hold in the rectangular notches in X. A spring, $Y^1$, forces the catch Y into these notches and holds it there, so as to retain the lever J in any position in which it may be left. $Y^2$ is a handle or sub-lever, pivoted to both J and Y, and adapted to allow the lever J to be moved at will whenever the hand of the engineer grasps the parts properly and holds the sub-lever Y closely in contact with the lever J, so as to lift and hold Y out of the notches. Z is a ring or clip pivoted on the upper end of J, and adapted to confine $Y^2$ in contact with J, or to release it, according as it is turned down or turned up. I is a connection from the lower end of the hand-lever J to an arm, H, on a transverse shaft, G. This shaft G may thereby be partially rotated, according as the lever J is turned. Arms, F, on the shaft G, support the Stevenson links by the aid of connections depending from F, in the usual manner. With the exception of the slight clip ring or link Z, the construction and arrangement of the hand-lever J, and of all the parts connected thereto, are substantially the same as in those locomotives of the usual character in which the Stevenson link is employed. I mount at the opposite end, and, by preference, on the opposite side of the dummy, a hand-lever, *j*, precisely similar in every respect to the lever J, already described. It is connected by a rod, *i*, to an arm, *h*, on the shaft G, so as to control the position of the latter in the lever J, and is similarly hung on a centre, *j'*, and similarly provided with notched quadrants, *x*, locking bolt *y*, spring $y^1$, handle $y^2$, and clip *z*. Now, by forcing down the clip Z properly upon the handle $Y^2$, so as to hold up the locking bolt or catch Y, the engines *k k* may be controlled by the engineer through the medium of the lever *j* and its connections, while the lever J and its connections will swing idly. On the other hand, by forcing down the clip *z* upon the handle $y^2$, so as to hold the locking bolt or catch *y* out of its notches, the engineer puts *j* and its attachments out of use, after which he walks to the other end of the dummy and lifts Z, and thence forward, commences to start and stop, or to regulate and control the engines *k k* by means of the lever J, while *j*, in its turn, sweeps idly around between its quadrants X. My invention therefore allows my locomotive to be operated through either J or *j*, as may be most convenient. The throttle-valve being usually held in place by friction alone, requires nothing more than a simple connection of levers at each end.

Some of the advantages due to certain features of my invention may be separately enumerated as follows:

First. By reason of my employment of the wheels U T, of unequal size, connected properly to the other parts, I am able, with large driving-wheels, to reduce the progressive motion of my machine relatively to the rotative velocity of the working parts, and thus to exert the proper force for the work required with much smaller cylinders and pistons than with the ordinary arrangement, and consequently with a smaller loss of steam in heating up the same and allowing the same to cool at short intervals. If large cylinders, or, in other words, large engines working slowly, were employed to act directly upon the wheels R, which support the load, the same or nearly the same effect would, after the parts had become properly heated, be produced by the same quantity of steam, but the same effect could not be produced when steam is first let on. In the use of a locomotive in moving cars through the streets of a city, the distances travelled are short, and the performance of the machine consists in a great number of short efforts with intervals of rest. In these intervals of rest the cylinders and pistons become partially or entirely cold, and they must be again heated on the admission of steam in commencing each effort. In the use of large cylinders much time and much heat are lost in preparing for each effort, but my small cylinders, *k k*, economize both these elements. Small cylinders connected to driving-wheels by toothed gearing, one of which gear-wheels is on an axle of the driving-wheels, have been at various times experimented on or described by others; but my wheels, U T, through which the rotary motion is transmitted with increased force and diminished speed from the engine to the drivers, are mounted so that neither moves up and down with the motions of the driving-wheels in passing over inequalities in the road, but so that their centres maintain their positions constant relatively to each other and to the boiler and main framing of the locomotive. I am able to impel small engines with high velocity, and impart therefrom a slower motion to the driving-wheels of the ordinary sizes, without involving any of the disadvantages which have attended the previous efforts to accomplish this end.

Second. By reason of the fact that my wheels U T are formed, not with tooth gear, but with friction-gearing, as specified, I am able to avoid any appreciable noise in the working of the gearing, and thus avoid the frightening of horses and allow the ready hearing of calls, alarms, &c., by the engineer, and also to avoid the break-downs which are liable to occur with tooth gearing when an engine of this character is suddenly reversed, started, or stopped. It is obvious that tooth gearing becomes loose by wear, so that however tightly the teeth may be fitted together when they are constructed, every day of their active employment contributes, by wearing away the surfaces, to make looseness or "back-lash," which allows severe concussions when the motion is suddenly changed. Especially are the teeth liable to strip, and the entire working mechanism, consequently, to fail at the most important crisis, to wit, when the engines are suddenly reversed at full speed to avoid a collision with persons or carriages on the street. The Hudson River railroad has several miles of double track lying in the city of New York. Three dummy engines, constructed in all respects in accordance with this specification, have been in successful use for several months on this part of the line, moving cars on the portions of such track which are most encumbered by the ordinary travel of streets. I am superintendent of the road, and I ascribe much of the success of these dummies to the rapidity with which they can be started, even when cold, to the great tractive force with which they operate, and to the freedom from danger of fracture with which they can be stopped and reversed in consequence of this feature of my invention. All friction-gearing previously introduced into locomotives, between the engines and the driving-wheels, have employed the driving-wheels themselves as one of the gear-wheels. Their liability to become worn irregular with use, and especially their constant jumping or yielding upward and downward in passing over the inequalities in the track, have prevented such arrangement from being useful. All previously known means of using small, quick-working engines in such machines, and, consequently, of realizing any of these advantages, were liable to such objections, so as to be almost or absolutely impracticable.

Third. By reason of my mounting and supporting the bearings of both the shafts, A and *t*, in one set of pedestals, which pedestals serve to guide and strongly connect the boxes of both shafts, I am able to adjust the relations of both to the other parts at a single operation, to urge them together with great force without involving any sensible tendency to spring or strain the framing, and also to allow for the wear of the brasses and a consequent distortion or change of position of the boxes of each or both bearings to an almost unlimited extent.

Fourth. By reason of my arrangement of the clips Z *z*, on two handles or starting-levers, J and *j*, one lever, J, adapted to be used when the engine is running in one direction, and the other, *j*, to be used when the engine is running, or is about to run, in the opposite direction, both of these levers, J and *j*, being connected to the same operating mechanism, G F, and to the links thereon depending, and each adapted to be either locked in the positions desired, or to be allowed to swing freely, according as it is or is not, for the time being, the lever by which the operation is controlled, I am able to conveniently attend to the working of the engine in either direction with the highest degree of ease and certainty, and to adjust the parts therefor without delay, and without expensive or cumbrous mechanism for the purpose.

Fifth. By reason of the fact that my deep tanks, W W′, are extended longitudinally of the structure in the manner represented, and are rigidly connected to the framing Q Q by the parts $Q^1$ $Q^1$ $Q^2$ $Q^2$, &c., I make the metal of such tanks contribute to support and stiffen the entire framework, and thus to increase materially the strength and durability of the machine.

Sixth. By reason of the fact that these tanks, W W′, are outside of the working parts and of the entire running-gear, I make the metal composing the tanks, and also the pipes or other contained parts, and even the water therein, serve as a defence against the injurious effects of possible collisions with animals, and with carriages, &c., so as to reduce the injury accruing to both machine and the impinging mass; and, by reason of the entire arrangement, connection, and disposition of these tanks when employed as a condenser, or in connection with means for circulating water therefrom through a condenser, I secure a large amount of radiating surface favorably exposed to the wind, for cooling the water without the expense and complication due to the ordinary arrangements, and contribute to the evenness of the load upon the several wheels, and to the general efficiency of my machine.

Having now fully described my invention, what I claim as new therein, and desire to secure by Letters Patent, is as follows:

1. I claim, in locomotives, transmitting motion from the crank-shaft A to the driving or bearing-wheels R, through the medium of the wheels U T, of unequal sizes, supported independently of the bearing-wheels, and maintained in fixed positions relative to each other and to the main framing of the engine, so as to be unaffected by the inequalities of the road, substantially as and for the purposes herein specified.

2. I claim the frictional gearing of the wheels U T, or equivalent wheels of unequal size, intervening between the engine and the driving-wheels of a locomotive, so arranged as to be both out of contact with the rails, substantially as and for the purposes herein specified.

3. I claim, in connection with the above, mounting the bearings of the crank-axle A, in the same pedestals with the bearings of the driven axle *t*, substantially as and for the purposes herein set forth.

4. I claim the employment in locomotives of a slight clip or catch Z, arranged relatively to separate hand-levers, J *j*, or their equivalents, connected each to the same starting and controlling mechanism, substantially in the manner and for the purpose herein specified.

5. I claim, in locomotives, so constructing and arranging the tanks W W′, that they are of little width, but greatly extended in longitudinal and vertical dimensions, and are rigidly framed together and to the framing Q Q, or its equivalent, substantially as and for the purposes herein set forth.

6. I claim, in locomotives, so constructing and arranging said tanks W W′ that they are of little width, but greatly extended in longitudinal and vertical dimensions, and are mounted outside of the working gear, substantially as and for the purposes herein set forth.

ALBA F. SMITH.

Witnesses:
D. L. Freeborn,
F. A. Hadicke.